Patented Apr. 25, 1950

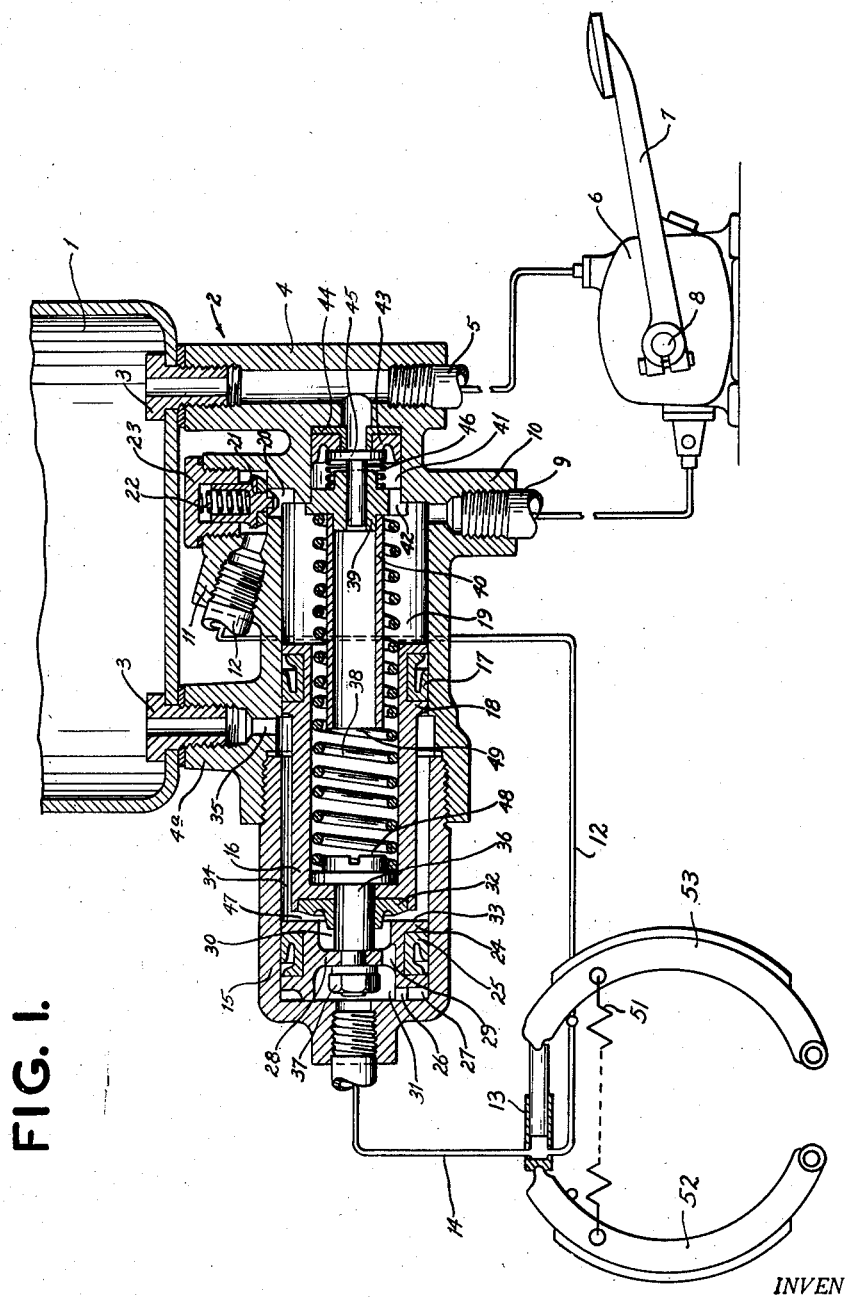

2,505,213

UNITED STATES PATENT OFFICE 2,505,213

AUTOMATIC CIRCULATING BLEEDING SYSTEM FOR HYDRAULIC BRAKES

Steve Schnell, Kirkwood, Mo., assignor to Wagner Electric Corporation, St. Louis, Mo., a corporation of Delaware Application June 12 1944, Serial No. 539,858

7 Claims. (Cl. 60—52)

This invention relates to hydraulic brake actuating systems for use on cranes, hoists, derricks, and self-propelled vehicles and in its more specific aspects is directed to a system in which the liquid is circulated through the several devices of the brake system in order to effectively and efficiently bleed any entrapped air from the hydraulic pressure fluid portion of the system.

The object of the invention is to provide in a hydraulically-operated brake, a valve system arranged between the master cylinder, brake cylinder, and fluid reservoir, which provides for a substantially closed fluid system in which said fluid flows in one direction only to enable entrapped air to be bled from the brake cylinder.

A further object of the invention is to provide a hydraulically-operated brake in which there is a substantially closed pressure fluid system having a valve therein that enables one portion of the system to be segregated from another portion of the system such that any entrapped air in the second mentioned portion is bled from the brake cylinder to the fluid reservoir and any fluid in the second portion is also returned to the fluid reservoir.

Other and further objects of the invention will occur to those skilled in the arts to which this application pertains as the description proceeds, which, taken in connection with the accompanying drawing, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawing:

Figure 1 shows a schematic layout of the invention with parts in section to show details of construction.

The hydraulic brake arts have devised various means and mechanisms for the removal of entrapped air in brake cylinders, all of which have required the personal attention of operators and service attendants to gain or have access to the brake cylinder itself in order to open the bleeder valve and release the entrapped air. The entrapped air when present in the system is an extremely troublesome factor contributing to an unreliable operation of the brakes and can only be removed from known prior art devices at considerable inconvenience and expense in time and labor. Also, when the bleeder valves heretofore used in connection with hydraulic brake systems had been opened, it had been necessary for the attendant to provide himself with a vessel of one variety or another to catch any fluid that was drained from the pressure system and then restore it to a reservoir associated with the master cylinder. This invention provides a convenient means and mechanism for eliminating the manual opening and closing of a bleeder valve located on the brake cylinder and subjects the bleeder valve to the control of the operator by manipulating the master cylinder in a predetermined manner, thereby providing for the circulation of liquid through the brake system and simultaneously removing any entrapped air therefrom. In such installations as traveling cranes, portable hoists and derricks, self-propelled vehicles, and so forth, where the brake is located at a considerable distance from the master cylinder device usually located at the operator's station, he can so manipulate his master cylinder that entrapped air will be bled from the brake cylinder and thus maintain a solid line of liquid between the master cylinder and the brake cylinder to provide for a positive and more efficient operation of the brake.

The above objects and advantages are achieved in the structure set forth in the accompanying drawing in which 1 is a reservoir preferably located at some elevated point having a valve housing 2 secured thereto by means of hollow or bored screw elements 3, 3 extending through the bottom wall of the reservoir and threaded into suitable bosses 4 and 4a in the valve housing. One of these bosses, 4, has an aperture formed therein at the lower end of which is threaded a conduit 5 that leads to a reservoir (not shown) located in master cylinder device 6 whose internal construction may be similar to that illustrated in United States Patent No. 1,758,671 to Loughead et al., dated May 13, 1930, for Pressure mechanism for brake systems. A foot pedal 7 is pivotally mounted on the device 6 by means of spindle 8 such that it may actuate a piston device (not shown) located within the master cylinder device 6 in order to generate pressure in the fluid system. The pressure fluid is exhausted from the master cylinder device 6 through conduit 9 which is threaded into another boss 10 formed in housing 2. Another boss 11 is formed on another part of the housing 2 to which conduit 12 is connected leading to the intake side of brake cylinder 13 and conduit 14 leads from the exhaust side of brake cylinder 13 and is threaded into a bossed end of another portion of the valve housing 2.

Brake cylinder 13 forms a part of the brake assembly shown in the drawings in which 52 and 53 are pivoted brake shoes on which suitable friction elements are mounted. One end of brake cylinder 13 is pivotally associated with member 53 and its opposite end is pivotally associated with member 52. Spring 51 is connected between brake shoes 52 and 53 to release them from engagement with the cooperating brake drum when pressure fluid is released from brake cylinder 13.

Valve housing 2 has a shell portion 15 threaded into said housing, one end of which is bossed, bored, and threaded to receive conduit 14 as previously described and pressure fluid is led through said bore in the end of shell 15 thence through suitable passageways subsequently described to and through the second bored screw element 3 threaded into the boss 4a on housing 2 and exhausts any fluid and air contained in conduit 14 and brake cylinder 13 into the reservoir or sump 1.

Valve housing 2 and shell 15 are concentrically bored to receive a piston 16 having a sealing cup element 17 arranged on the end 18 thereof and providing with the bore in housing 2, a chamber 19. Pressure fluid generated by the master cylinder device 6 exhausts into the chamber 19 and urges piston 16 and sealing cup 17 thereon to the left as viewed in the drawing. After pressure has been bluilt up to a predetermined value, it exhausts through duct 20 opening a normally closed intake valve 21 for motor 13 against the pressure or tension of spring 22. A cap and plug element 23 is threaded into the boss 11 and applies tension to said spring to urge the valve to closed position. A suitable gasket may be arranged between the cap element 23 and the boss 11 in order to prevent leakage of pressure fluid. When the predetermined pressure has been built up, valve 21 is opened, allowing pressure fluid to be admitted to conduit 12 and thence conducted to brake cylinder 13 to operate the same. Pressure fluid continues to flow until the pressure in conduit 12 equals the pressure in chamber 19 whereupon valve 21 recloses.

Pressure fluid is also appliable to the opposite end of the valve housing and shell 15 has arranged therein a piston 24 provided with a sealing cup 25. The piston 24 is turned down and slotted as at 26 and forms a chamber 27 which receives pressure fluid coming from conduit 14, pressure fluid being conducted through said slot 26. The web 28 of the piston has an aperture 29 provided therein that connects the chambers 30 and 31. The piston 24 normally rests against the end of shell 15 as shown in the drawing, being urged into that position by the action of spring 38 later described.

Piston 16 is of a longitudinally extended variety and its left end receives the exhaust valve element 32 that engages the exhaust valve seat 33 formed on the end of piston 24. The chamber 34 connects, by means of duct 35, with previously described hollow screw element 3 to exhaust into the reservoir 1, fluid passing passage 47 constituting the space closed by the valve element 32 engaging the seat 33.

Piston 16 has a stud 36 arranged in the end thereof extending through valve 32 and has a threaded reduced end extending through the web 28 and piston 24 and is rigidly secured thereto by means of a nut and washer combination 37. A spring 38 is arranged within piston 16 and engages the end of stud 36 and at its opposite end it engages with a plug element 39 fitting in a counterbore 41 concentric with chamber 19. Concentrically disposed within the spring 38 is a sleeve 40, one end of which is fixed to the plug 39. Spring 38 is a relatively strong spring and urges the piston 24 through stud 36 into engagement with the left end of shell 15.

Plug 39 closes one end of the counterbore 41 and has a slot 42 formed therein connecting the chamber formed by counterbore 41 with the chamber 19. The counterbore is further counterbored, extending through to the duct 4 formed in the valve housing and the larger diameter portion of the counterbore has a sealing cup 43 therein arranged about a flanged sleeve element 44. The sealing cup 43 forms a valve seat for valve 45 and spring 46, which is of a very small gauge, fits about a bossed end of plug 39, and serves to hold valve 45 centrally disposed with respect to the valve seat formed on sealing cup 43. Valve 45 permits fluid to flow from reservoir 1 to chamber 19 but prevents a reverse flow of fluid from chamber 19 to reservoir 1.

The operation of this device depends upon intermittent application of the master cylinder device 6 producing pressure within chamber 19 and opening valve 21 after the pressure has increased to a predetermined value to thereby admit pressure fluid to the brake cylinder 13. The building up of pressure in chamber 19 urges piston 16 to the left and closes the passageway 47, thereby preventing flow of any fluid in conduit 14, chambers 30, 31 and 34 to the reservoir or sump 1. Upon the release or cessation of operation of the master cylinder device 6, pressure fluid will escape from chamber 19 back to the master cylinder device 6 through conduit 9. Retraction of the piston in the master cylinder 6 under the influence of the spring therein normally draws back fluid by suction and after the uncovering of the compensating port, gravitational action balances the fluid columns. Pressure fluid from brake cylinder 13 will be prevented from flowing back to the master cylinder device because valve 21 will close as soon as the pressure on one side thereof is equal to or higher than the pressure in chamber 19 and will remain closed as long as this condition exists. Simultaneously with the release of pressure fluid from chamber 19, pressure is still present in space 27 by reason of having been put there by the action of master cylinder 6, spring 51 in retracting the brake shoes, and the reduction of pressure in chamber 19, all of which combine to maintain pressure in said chamber 27, which pressure will urge pistons 24 and 16 to the right until such time as face 48 on stud 36 engages with the end 49 on sleeve 40. Spring 51 associated with the brake assembly is of a strength sufficient to move pistons 16 and 24 in the cylinder in housing 2 against the action of spring 38. Continued motion of piston 16 by reason of the aforesaid pressure will produce relative motion between piston 24 and piston 16 on stud 36 to thereby open the valve passageway 47 and permit pressure fluid to flow into chamber 34 and thence into reservoir 1 through duct 35.

On initial installation of the apparatus, or at any other time when it may be thought advisable to have assurance that the system is free of entrapped air, the brake pedal may be actuated in brake applying direction and released several times whereby a substantial quantity of fluid will be moved through the system to the reservoir and thus assure that all entrapped air is carried out of the system.

After release of pressure on the fluid in chamber 19 and during the restoration of the piston to the position indicated in the figure under the influence of spring 38, a partial vacuum may be created in chamber 19. This vacuum causes the opening of valve 45, allowing liquid to flow from conduit 4 and reservoir 1 into chamber 19 until it is completely filled whereupon when the same pressure will exist on one side of the valve 45 as on the other, it will close. By this means the system below valve 24 is always maintained full and ready for the next operation. Pressure in chamber 19 will act to firmly seat valve 45 to prevent pressure fluid from flowing into reservoir 1 from said chamber. If any vacuum is produced in the brake cylinder or chambers 27, 30, 31, and 39 or conduits 12 and 14 connected therewith, they will be filled by fluid flowing through duct 35 from reservoir 1 through the apertured screw 3 thereby maintaining the other side of the brake system filled with liquid. Liquid circulated by the above device prevents heating and a re-use of any heated liquid that may be in the system.

Having fully described my invention, what I claim as new and desire to secure by Letters Patent of the United States is:

1. In a hydraulic brake system; a master cylinder; a brake cylinder; an elevated liquid reservoir; a control element; a first conduit connecting said reservoir and said master cylinder; a second conduit connecting said control element and master cylinder; a third conduit connecting said control element and said brake cylinder; a fourth conduit connecting said brake cylinder and said reservoir; a first valve in the control element arranged in said fourth conduit; means to operate said valve controlled by said master cylinder; a second valve in said control element arranged in said third conduit; said first mentioned valve when closed by said master cylinder preventing flow of pressure fluid into said reservoir through said fourth conduit; said second valve holding pressure fluid in said brake cylinder after said master cylinder is operated to thereby operate said brake cylinder, and when pressure is relieved on said means the pressure fluid held by said second valve will open said first valve to exhaust liquid and entrapped air into said reservoir.

2. In a hydraulic brake system; a fluid reservoir, a master cylinder, and a brake assembly; conduit means to serially connect each of said devices; a control element rigidly connected to said fluid reservoir, said control element containing ducts included in said means to serially connect said devices, said control element comprising a pair of valves including a normally closed inlet valve for said brake cylinder and a normally open exhaust valve for said brake cylinder; said exhaust valve comprising a piston device on one end of which said exhaust valve is mounted seatable on another piston device axially aligned with said first mentioned piston; said exhaust valve closable by pressure fluid developed in said master cylinder and exhausted into said control element and acting against said first mentioned piston to close said exhaust valve; said inlet valve openable after pressure fluid in said control element achieves a predetermined value to operate said brake cylinder; said exhaust valve opening when pressure is relieved against said piston while said master cylinder is inoperative; and pressure fluid in said brake cylinder opening said exhaust valve by urging said first mentioned piston in the opposite direction from which it was first moved to thereby exhaust fluid in said brake cylinder to said fluid reservoir.

3. In a control element for a hydraulic brake; a longitudinally extended housing; a longitudinally extended first piston reciprocably mounted in said housing; a second piston mounted in said housing and connected to said first piston; means to permit less relative movement of one piston with respect to the other; a valve arranged between said pistons closable upon relative movement of said pistons; a second valve associated with said housing and openable after a predetermined pressure is present in said housing acting against said valve; a third valve in said housing to permit fluid to enter said housing from said reservoir when a vacuum is produced therein following any excess movement of said pistons relative to each other; and resilient means urging said second piston into engagement with one end of said housing to maintain said exhaust valve in open condition.

4. In a control element for a hydraulic brake; a longitudinally extended housing having a cylinder bore therein; a first piston element in said bore; a second piston element in said bore; means connecting said pistons for simultaneous movement and movement relative to each other; resilient means urging said second piston into engagement with the end of said cylinder bore; valve means disposed between said pistons and maintained in a normally open condition by said resilient means; a second valve normally closed arranged in said housing; and a third valve in said housing connectable to a fluid reservoir to admit pressure fluid therefrom into said piston when a vacuum is produced in said cylinder bore because of excess movement of said first piston in said cylinder bore.

5. In a hydraulic brake system; a fluid reservoir, a master cylinder, and a brake cylinder serially connected, said reservoir disposed in an elevated position with respect to said brake cylinder and said master cylinder; a control element secured to said housing and including duct means connected to said means serially connecting said devices; said control element including a longitudinally extended housing having a cylinder bore therein; a first piston in said bore; a second piston in said bore; means connecting said pistons to enable one piston to move relatively axially of the other in said cylinder bore; a normally open valve between said pistons arranged on the exhaust side of said brake cylinder; a normally closed inlet valve fixed in said housing and arranged in the inlet of said brake cylinder, said exhaust valve closable upon relative motion of said pistons by pressure fluid introduced into said cylinder bore from said master cylinder, said inlet valve opening after pressure fluid obtains a predetermined pressure value and thereafter operating said brake cylinder, said inlet valve closing when the pressures on opposite sides thereof are equal; pressure fluid entrapped in said brake cylinder moving both of said pistons upon release of pressure in the cylinder bore when said master cylinder is inoperative; means to arrest the motion of one of said pistons to thereby open said exhaust valve by said entrapped pressure fluid; and valve means controlling a passage between said fluid reservoir and said cylinder bore when vacuum is produced in said cylinder bore; resilient means to urge one of said pistons to their normally inoperative position; said vacuum being produced in said cylinder bore upon return motion of said first piston and fluid from said reservoir filling said cylinder bore by the action of the vacuum therein on said third valve.

6. In a hydraulic brake system; a liquid reservoir, a master cylinder, and a brake cylinder serially connected; said reservoir disposed at a higher elevation than said brake cylinder; conduit means to serially connect said devices; a control element rigidly connected to said reservoir; duct means in said control element connected to said conduit means to serially connect said devices; said control element including a housing having a longitudinally extended cylinder bore therein; a first piston in said bore; a second piston in said bore; means connecting said pistons to enable them to move relatively axially of each other; a valve arranged in one of said pistons and seatable against the other of said pistons and arranged in the exhaust of said brake cylinder; an inlet valve in said housing disposed in the intake to said brake cylinder; resilient means in said bore urging one of said pistons into engagement with the end of said cylinder bore and to normally maintain said exhaust valve in open condition, said master cylinder exhausting into said cylinder bore against said first piston to close the exhaust valve, said inlet valve opening after the pressure in said bore is at a predetermined value and closing when pressure on both sides of said inlet valve is at the same value; pressure fluid in said brake cylinder urging both of said pistons in a direction opposite to the first movement imposed on said first piston; and means to arrest the motion of said second piston and open said exhaust valve to thereby exhaust fluid from said brake cylinder to said reservoir; and other valve means operable by vacuum developed in said cylinder bore when said longitudinally extended piston is restored to its normal position, said valve closable when the cylinder bore is again filled with fluid derived from said reservoir.

7. In a hydraulic brake system, a fluid compressor; a fluid reservoir positioned a substantial distance above the compressor; a fluid motor having an exhaust port and an inlet port; means establishing communication between said exhaust port and said reservoir; a valve in said means; means establishing a fluid pressure line between said compressor and said inlet port; a valve in said last mentioned means to prevent the flow of fluid from said motor to said compressor; means establishing communication between said reservoir and the fluid line connecting the compressor and motor; and a valve in said second means to prevent flow of fluid from said compressor to said reservoir.

STEVE SCHNELL.

REFERENCES CITED

The following references are of record in the file of this patent:

UNITED STATES PATENTS

| Number | Name | Date |
|---|---|---|
| 1,758,671 | Loughead | May 13, 1930 |
| 1,985,812 | Banas | Dec. 25, 1934 |
| 2,014,338 | Messier | Sept. 10, 1935 |
| 2,081,056 | Loweke | May 18, 1937 |
| 2,112,356 | Bock | Mar. 29, 1938 |
| 2,185,277 | Stelzer | Jan. 2, 1940 |
| 2,246,379 | Muir | June 17, 1941 |
| 2,351,153 | Schnell | June 13, 1944 |

Certificate of Correction

Patent No. 2,505,213 April 25, 1950

STEVE SCHNELL

It is hereby certified that error appears in the printed specification of the above numbered patent requiring correction as follows:

Column 6, line 6, strike out the word "less";

and that the said Letters Patent should be read with this correction therein that the same may conform to the record of the case in the Patent Office.

Signed and sealed this 18th day of July, A. D. 1950.

[SEAL]

JOE E. DANIELS,
*Assistant Commissioner of Patents.*